United States Patent [19]

Fergason

[11] Patent Number: 5,537,256
[45] Date of Patent: Jul. 16, 1996

[54] ELECTRONIC DITHERING SYSTEM USING BIREFRIGENCE FOR OPTICAL DISPLAYS AND METHOD

[76] Inventor: James L. Fergason, 92 Adam Way, Atherton, Calif. 94025

[21] Appl. No.: 328,375

[22] Filed: Oct. 25, 1994

[51] Int. Cl.$^6$ .............. G02B 5/30; G02B 26/08; G02F 1/00; G09G 3/00
[52] U.S. Cl. .............. 359/495; 359/303; 359/497; 345/32; 348/767
[58] Field of Search .............. 359/484, 494, 359/495, 279, 301, 303, 497; 348/766, 767, 751, 752, 756, 761, 762; 345/32, 149

[56] References Cited

U.S. PATENT DOCUMENTS

| | | |
|---|---|---|
| Re. 32,521 | 10/1987 | Fergason . |
| 3,329,474 | 7/1967 | Harris et al. .............. 359/303 |
| 3,375,052 | 3/1968 | Kosanke et al. .............. 359/279 |
| 3,428,743 | 2/1969 | Hanlon .............. 348/816 |
| 3,439,348 | 4/1969 | Harris et al. .............. 365/121 |
| 3,499,700 | 3/1970 | Harris et al. .............. 359/303 |
| 3,503,670 | 3/1970 | Kosanke et al. . |
| 3,554,632 | 1/1971 | Chitayat . |
| 4,012,116 | 3/1977 | Yevick .............. 359/465 |
| 4,110,794 | 8/1978 | Lester et al. . |
| 4,385,806 | 5/1983 | Fergason . |
| 4,410,238 | 10/1983 | Hanson .............. 359/93 |
| 4,516,837 | 5/1985 | Soref et al. .............. 359/39 |
| 4,540,243 | 9/1985 | Fergason . |
| 4,648,691 | 3/1987 | Oguchi et al. . |
| 4,649,425 | 3/1987 | Pund .............. 348/52 |
| 4,719,507 | 1/1988 | Bos .............. 359/73 |
| 4,755,038 | 7/1988 | Baker .............. 359/63 |
| 4,834,500 | 5/1989 | Hilsum et al. . |
| 4,910,413 | 3/1990 | Tamune . |
| 4,917,452 | 4/1990 | Liebowitz .............. 359/39 |
| 4,958,915 | 9/1990 | Okada et al. . |
| 4,969,717 | 11/1990 | Mallinson .............. 359/39 |
| 4,991,924 | 2/1991 | Shankar et al. .............. 359/39 |
| 5,012,274 | 4/1991 | Dolgoff . |
| 5,013,140 | 5/1991 | Healey et al. .............. 359/39 |
| 5,074,647 | 12/1991 | Fergason et al. .............. 359/63 |
| 5,083,199 | 1/1992 | Borner .............. 348/59 |
| 5,128,782 | 7/1992 | Wood . |
| 5,138,449 | 8/1992 | Kerpchar .............. 348/443 |
| 5,187,603 | 2/1993 | Bos .............. 359/73 |
| 5,300,942 | 4/1994 | Dolgoff . |
| 5,305,146 | 4/1994 | Nakagaki .............. 359/634 |
| 5,311,217 | 5/1994 | Guerin et al. .............. 346/108 |
| 5,357,369 | 10/1994 | Pilling et al. .............. 359/462 |
| 5,369,266 | 11/1994 | Nohda et al. . |
| 5,436,755 | 7/1995 | Guerin .............. 359/249 |

FOREIGN PATENT DOCUMENTS

| | | |
|---|---|---|
| 62-47623 | 2/1987 | Japan . |
| 63-13018 | 1/1988 | Japan . |
| 0198383 | 4/1989 | Japan . |
| 5289044 | 11/1993 | Japan . |

*Primary Examiner*—Paul M. Dzierzynski
*Assistant Examiner*—Darren E. Schuberg
*Attorney, Agent, or Firm*—Renner, Otto, Boisselle & Sklar

[57] ABSTRACT

An electronic dithering system based on birefringence or double refraction increases the resolution of a display and includes a birefringent material, such as a calcite material, which selectively refracts or deflects light depending on an optical polarization characteristic of the light, and a switch to switch the optical polarization characteristic of the light, thereby to determine the location of output optical information. Thus, the apparatus and method of the invention can change the location of an optical signal, and the change can be used for a number of purposes, such as to improve resolution of a display, to provide an auto-stereoscopic output, to interlace optical signals, to facilitate locating and hiding of circuitry, to facilitate overlapping of tiles or pixels, etc.

51 Claims, 3 Drawing Sheets

CLOSE UP OF A SINGLE LENS ELEMENT
FIG. 9

ELECTRONIC DITHERING SYSTEM USING BIREFRIGENCE FOR OPTICAL DISPLAYS AND METHOD

TECHNICAL FIELD

The present invention relates generally, as is indicated, to electronic dithering systems for optical displays and methods, and, more particularly, to dithering systems and methods for changing the location of an optical signal.

BACKGROUND

Dithering systems have been used in a number of technologies in the past. The objective of a dithering system is to change a characteristic of a particular signal in a periodic (or random) fashion in order to provide a useful output. As is described in further detail, the dithering system of the invention may be used to change the relative location of an optical signal.

In an exemplary liquid crystal display sometimes referred to as an image source, there usually are a plurality of picture elements, sometimes referred to as pixels or pels, and these pixels can be selectively operated to produce a visual output in the form of a picture, alphanumeric information, etc. Various techniques are used to provide signals to the pixels. One technique is to use a common electrode on one plate of a liquid crystal cell which forms the display and an active matrix electrode array, such as that formed by thin film transistors (TFT), on the other plate of the liquid crystal cell. Various techniques are used to provide electrical signals to the TFT array to cause a particular type of optical output from respective pixels.

One factor in determining resolution of a liquid crystal display is the number of pixels per unit area of the liquid crystal display. For example, Sony Corporation recently announced a 1.35 inch diagonal high resolution liquid crystal display which has 513,000 pixels arranged in 480 rows of 1,068 pixels per row.

Another factor affecting resolution is the space between adjacent pixels sometimes referred to "as optical dead space". Such space ordinarily is not useful to produce an optical signal output. The space usually is provided to afford a separation between the adjacent pixels to avoid electrical communication between them. The space also is provided to accommodate circuitry, leads, and various electrical components, such as capacitors, resistors, and even transistors or parts of transistors.

There is a continuing need and/or desire to improve resolution of displays. It also would be desirable to facilitate the placing of circuitry in a display while minimizing the optical dead space caused by the circuitry.

The present invention may be used with various types of displays and systems. Exemplary displays are a CRT (cathode my tube) display, a transmissive liquid crystal display that modulates light transmitted therethrough, reflective liquid crystal displays, light emitting displays, such as electroluminescent displays, and so on.

Conventional optical displays typically display graphic visual information, such as computer generated graphics, and pictures generated from video signals, such as from a VCR, from a broadcast television signal, etc.; the pictures may be static or still or they may be moving pictures, as in a movie or in a cartoon, for example. The visual information also may be of the alphanumeric type in which numbers, letters, words, and/or other symbols (whether in the English language or in some other language) are presented for view. Visual information viewed by a person (or by a machine or detector) usually is in the form of visible light. Such visible light is referred to as a light signal or an optical signal. The term optical signal with which the invention may be used includes visible light, infrared light, and ultraviolet light, the latter two sometimes being referred to as electromagnetic radiation rather than light. The optical signal may be in the form of a single light ray, a light beam made up of a plurality of light rays, a light signal such as a logic one or a logic zero signal used in an optical computer, for example, or the above-mentioned alphanumeric or graphics type display. Thus, as the invention is described herein, it is useful with optical signals of various types used for various purposes. Therefore, in the present invention reference to optical signal, light ray, light beam, light signal, visual information, etc., may be used generally equivalently and interchangeably.

The picture elements (pixels or pels) mentioned above may be discrete pixels, blocks or areas where an optical signal can be developed by emission, reflection, transmission, etc. such as the numerous pixels in the miniature image source of Sony Corporation mentioned above. The optical signal referred to may mean that light is "on" or provided as an output from the device, or that the pixel has its other condition of not producing or providing a light output, e.g., "off"; and the optical signal also may be various brightnesses of light or shades of gray. Alternatively, the optical output or optical signal produced by a pixel may be a color or light of a particular color.

The pixels may be a plurality of blocks arranged in a number of lines or may be a number of blocks randomly located or grouped in a pattern on the display or image source (source of the optical signal). The pixels may be a number of lines or locations along the raster lines that are scanned in a CRT type device or the pixels may be one or a group of phosphor dots or the like at particular locations, such as along a line in a CRT or other device.

The optical signal produced by one or more pixels may be the delivery of light from that pixel or the non-delivery of light from that pixel, or various brightnesses or shades of gray. To obtain operation of a pixel, as is described herein, for example, the pixel may be energized or not. In some devices energizing the pixel may cause the pixel to provide a light output, and in other devices the nonenergizing of the pixel may cause the providing of a light output; and the other energized condition may cause the opposite light output condition. It also is possible that the nature of the light output may be dependent on the degree of energization of a pixel, such as by providing the pixel with a relatively low voltage or relatively high voltage to obtain respective optical output signals (on and off or off and on, respectively).

For example, in a conventional twisted nematic liquid crystal display device, polarized light is received by a liquid crystal cell, and depending on whether the liquid crystal cell receives or does not receive a satisfactory voltage input, the plane of polarization of the light output by the liquid crystal cell will or will not be rotated; and depending on that rotation (or not) and the relative alignment of an output analyzer, light will be transmitted or not. In an optical phase retardation device that has variable birefringence, such as those disclosed in U.S. Pat. Nos. 4,385,806, 4,540,243, and Re. 32,521 (sometimes referred to as surface mode liquid crystal cells), depending on the optical phase retardation provided by the liquid crystal cell, plane polarized light may be rotated, and the optical output can be determined as a function of the direction of the plane of polarization.

SUMMARY

With the foregoing in mind, then, one aspect of the present invention is to increase the resolution of a display by using a dithering system, and especially a dithering system operative based on birefringence (also known as double refraction).

Another aspect relates to use of dithering to obtain three dimensional images, especially using auto-stereoscopic effect.

Another aspect relates to using dithering to effect beam switching of optical signals.

According to an aspect of the invention, a device for determining the location of an optical signal includes birefringent means for selectively refracting light based on optical polarization characteristic of the light, and means for changing such optical polarization characteristic of light, the birefringent means and the changing means being cooperative to determine the location of the optical signal.

According to another aspect, a system for increasing the resolution of an optical display having a plurality of picture elements includes birefringent means for selectively refracting light based on polarization characteristics of the light, changing means for selectively changing the polarization characteristics of light, and the birefringent means and the changing means being in optical series and cooperative in response to selective operation of the changing means to change the location of output optical signals therefrom.

According to another aspect, a display system includes a display for producing visual output information by selective operation of a plurality of picture elements at respective locations, and means for changing the location of the output information as a function of optical polarization thereby effectively to increase the number of picture elements.

According to another aspect, a display system includes a display for producing visual output information by selective operation of a plurality of picture elements at respective locations, and means for changing the location of the output information without physical realignment of a mechanical device thereby effectively to increase the number of picture elements.

According to another aspect, a display system includes a display for producing visual output information by selective operation of a plurality of picture elements at respective locations, and means for electro-optically changing the location of the output information thereby effectively to increase the number of picture elements.

According to another aspect, a method for displaying visual information includes presenting a first optical output from a source by providing plural optical signals arranged in a pattern, presenting a second optical output from the source by providing plural optical signals arranged in a pattern, and selectively shifting the location of the pattern of the second optical output relative to the location of the pattern of the first optical output based on optical polarization.

According to another aspect, an electronic dithering system for shifting polarized light includes birefringent means for selectively refracting light as a function of a polarization characteristic of the light, and changing means for changing the polarization characteristic of polarized light to provide output light that is shifted or not as a function of optical polarization.

According to another aspect, a method of making a display includes positioning in optical series an image source, a birefringent means for selectively refracting light based on optical polarization characteristic of the light, and a changing means for changing such optical polarization characteristic.

Using principles of the invention, the location of an optical signal can be changed, and the change can be used for a number of purposes. For example, the change can be used to improve resolution of a display, to provide an auto-stereoscopic output, to interlace optical signals for a variety of purposes, to facilitate locating and hiding of circuitry used in a display, to facilitate overlapping of tiles or pixels in a display, etc. A number of these examples are presented below. The invention may be used to achieve one or more of those and other uses.

One or more of these and other objects, features and advantages of the present invention are accomplished using the invention described and claimed below.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

DESCRIPTION

Figures 1, 2:
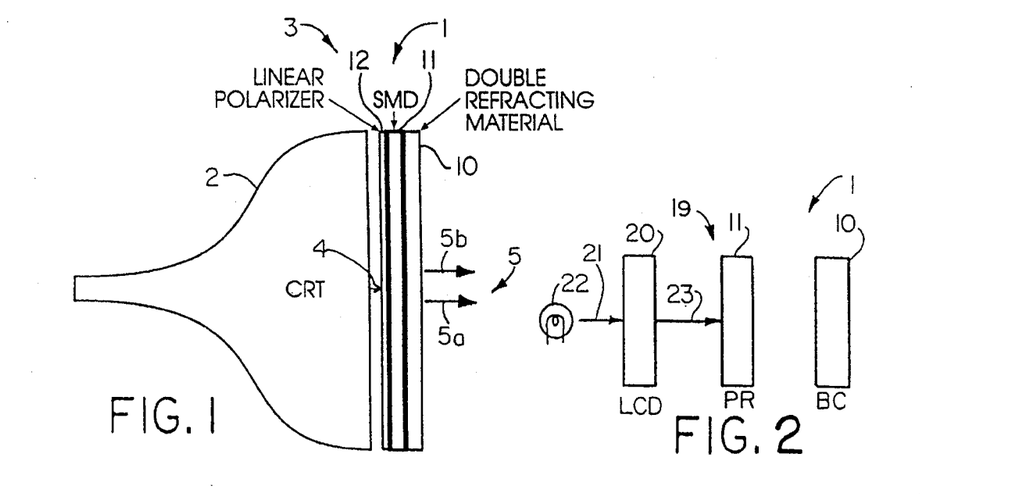
FIG. 1 is a schematic side elevation view of a CRT display including an electronic dithering system according to the present invention.
FIG. 2 is a schematic illustration of the components of the electronic dithering system.

Referring, now in detail to the drawings wherein like reference numerals designate like parts in the several figures and initially to FIG. 1, an electronic dithering system in accordance with the present invention is generally indicated at 1 in use with a display 2 shown as a cathode ray tube (CRT) to form an optical display system 3 for providing optical signals, visual information, etc., as the output therefrom. The display 2 provides a source of light or optical signals, and such light is transmitted through the electronic dithering system to provide optical signals at respective locations for viewing or the like. Exemplary light is represented by an arrow 4, such as an optical signal produced at a particular location by the display 2. The output optical signal 5 is represented by an arrow 5a at a location as a result of the optical signal 4 and a particular state, such as on or off, of the electronic dithering system 1. Additionally, arrow 5b represents the location of the output optical signal 5 resulting from the optical signal 4 being transmitted through the electronic dithering system 1 while the electronic dithering system is in the other of the states, such as off or on, thereof. Thus, it will be appreciated that the location of the output optical signal 5a, 5b, for example, resulting from an incident optical signal 4 on the electronic dithering system will be a function of the particular operative state of the electronic dithering system 1, as is described in further detail below.

Dithering may refer to the physical displacement of an image. An electronic dithering system (EDS) refers to an electro-optic means to physically shift an image. The description below discusses an EDS using a cathode ray tube (CRT) as the display source or a liquid crystal cell as a display source, but it will be appreciated that any type of display source may be used, such as any type of flat panel display or other display.

The electronic dithering system 1, as it is shown in FIG. 1, includes birefringent material, which sometimes is referred to as double refracting material, 10. An example of birefringent material is a calcite crystal material. Other double refracting (birefringent) materials also may be used. The birefringent material 10 may transmit light straight through or may refract the light which is incident thereon, depending on a characteristic of the light incident thereon, such as optical polarization characteristic. In the illustrated embodiment the optical polarization characteristic is the direction of the electric vector of plane polarized light. Thus, plane polarized light having one direction of electric vector (direction of the polarization axis, the transmission axis of the light, the plane of polarization of the light, or the direction of polarization) may transmit directly through the birefringent material 10, whereas light having a different direction of plane of polarization may be refracted by the birefringent material 10.

In the optical display system 3 embodiment illustrated in FIG. 1 the electronic dithering system 1 also includes a switch 11 that can be operated to change the characteristic of light relevant to the birefringent material 10 that determines the location of the output optical signal. In the exemplary embodiment of FIG. 1 refraction of light or transmission of light without refraction by the birefringent material 10 depends on the direction of polarization of plane polarized light incident on the birefringent material 10, and the switch 11 is able to switch the direction of polarization of such light incident on the birefringent material 10.

In the embodiment illustrated in FIG. 1 the switch 11 is a liquid crystal cell or liquid crystal shutter type device which is able to transmit light to the birefringent material 10 such that the light incident on the birefringent material has a plane of polarization determined by the switch. Accordingly, if the switch is in one operative state or mode, the light incident on the birefringent material 10 may have a plane of polarization such that the output optical signal 5 occurs at the location of the arrow 5a, and with the switch 11 in a different state of energization, for example, the plane of polarization of the light incident on the birefringent material 10 can be changed (e.g., switched to an orthogonal direction to the first-mentioned plane) thereby to cause the output optical signal to occur at the location of the arrow 5b.

A linear polarizer (sometimes referred to as a plane polarizer) 12 is between the switch 11 and the display 2 (CRT). The light 4 provided by the display 2 is plane polarized by the polarizer 12. The direction of polarization in cooperation with one condition of the switch 11 will result in the light being transmitted directly through the birefringent material 10 without refraction so as to appear at location of arrow 5a. However, in response to the other condition of the switch 11, the light will be refracted by the birefringent material 10 so as to occur at the location of the arrow 5b.

With the foregoing in mind, then, it will be appreciated that the invention includes a material that can move the location of an output optical signal relative to the location of an incident (input) optical signal depending on a characteristic of the incident optical signal, such as the direction of plane polarized light. The electronic dithering system 1 of the invention includes birefringent, double refracting, or equivalent material and a means to switch or to discriminate the characteristic of the incident optical signal.

In the embodiment illustrated in FIG. 1, the light 4 from a CRT is unpoladzed. The polarizer 12 gives the light a characteristic of linear (plane) polarization. The switch 11 can change the direction of polarization, e.g., the direction of the electric vector of the polarized light. The birefringent material provides the output optical signal at the location 5a, 5b, depending on the characteristic of the light incident on the bireffingent material.

The switch 11 may be a liquid crystal cell or several liquid crystal cells, such as twisted nematic liquid crystal cells, birefringent liquid crystal cells, such as those disclosed in U.S. Pat. Nos. 4,385,806, Re. 32,521, and 4,540,243, the entire disclosures of which hereby are incorporated by reference. If desired, the liquid crystal cells may be arranged in a push-pull arrangement to improve linearity of response, and/or for other purposes, for example, as is disclosed in one or more of the aforementioned patents. Other types of liquid crystal cells also may be used for the switch 11. Further, other types of devices that are able to switch the optical characteristic of light, such as the direction of plane polarization, etc., may be used for the switch 11.

An advantage to using a liquid crystal display as the display 2 with the dithering system 1 is that the output light from a liquid crystal display usually has a characteristic of optical polarization, such as linear polarization. In such a case, the linear polarization characteristic provided by the displays may permit the elimination of a separate linear polarizer 12 in connection with the electronic dithering system 1.

In FIG. 2 the electronic dithering system 1 is shown in use an optical display system 19 having a transmissive liquid crystal display 20. The liquid transmissive display 20 may be a twisted nematic liquid crystal display, bireffingent liquid crystal display, or some other type of liquid crystal display which produces in response to input light 21 from a light source 22, output light represented by an arrow 23. The output light 23 may be, for example, a graphic image, one or more light beams that are selectively turned on or off depending on operation of the liquid crystal display 20, etc. The graphical image may be a moving image, an alphanumeric display, etc. The dithering system 1 includes a bireffingent material 10 and a switch 11. To simplify the following description, the switch 11 may be referred to as a polarization rotator, which rotates the plane of polarization of the light represented by arrow 23 an amount depending upon the energization state or condition of the polarization rotator. For example, if the switch 11 were a twisted nematic liquid crystal cell, when it is de-energized, it would rotate the plane of polarization by 90 degrees (or some other amount depending on the nature of the liquid crystal cell), and when the twisted nematic liquid crystal cell is in a fully energized condition, it would not rotate the plane of polarization of the light incident thereon. Similar operation could be obtained by using birefringent liquid crystal cells. Additionally, if desired, compensation may be provided for residual retardation in a liquid crystal cell, whether of the birefringent or twisted nematic type; such compensation may be provided by a waveplate or the like, such as a quarter waveplate positioned in a particular orientation relative to the rub direction or axis of the liquid crystal cell used in the switch 11.

Figure 3:
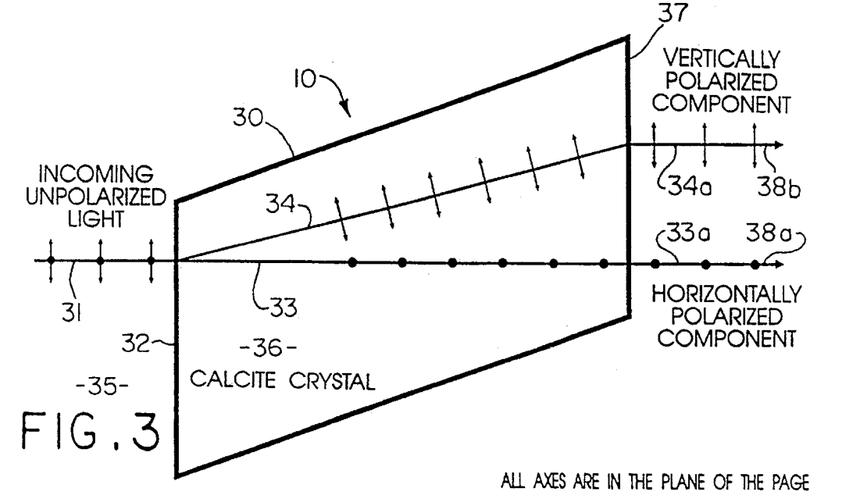
FIG. 3 is a schematic illustration of the double refraction effect through a calcite crystal which may be used in the electronic dithering system of the invention.

Turning to FIG. 3, there is shown an example of birefringent material 10 in the form of the mineral calcite, also referred to as a calcite crystal 30. Unpolarized light 31 enters the calcite 30 at the left hand face 32 thereof. The light enters at a right angle to the face 32. The light 31 is resolved into two orthogonally polarized components 33, 34 in view of the birefringent nature of the calcite. The optical axis of the light components 33, 34 are oriented such that one component 33 has a plane of polarization or electric vector direction into and out of the plane of the drawing of FIG. 3, as is represented by the dots shown in FIG. 3, and such light 33 experiences an index of refraction change between the environment 35 outside the calcite 30 and the environment 36 inside the calcite 30. However, the axis of the calcite crystal 30 is at a right angle to the plane of polarization to the light 33, and, therefore, this components of light 33 travels through the calcite crystal 30 without deflection (refraction).

The light component 34 is polarized vertically in the plane of the drawing of FIG. 3 and is represented by a double-headed arrow in the drawing. The light component 34 experiences a change in index of refraction as above; however, the light component 34 also encounters the calcite crystal axis at an angle which is other than a fight angle. Therefore, the light component 34 is refracted and its path is deflected as it travels through the crystal 30, as is shown in FIG. 3. This property of refraction of one polarization component and no refraction of the other polarization component of light incident on a birefringent material sometimes is called double refraction, and it occurs in many materials. The amount of physical displacement between the light components 33, 34 where they exit the right hand face 37 of the calcite crystal 30 and become, respectively, output light 33a, 34a represented by arrows at locations 38a, 38b, respectively, depends on the thickness of the calcite crystal, indices of refraction of the calcite crystal and the external environment thereof, and the orientation of the optical axis of the specific material, as is known.

In the optical display system 3 of FIG. 1 in which the display 2 is a CRT and in the optical display system 19 of FIG. 2 the direction of polarization of light incident on the switch 11 and the orientation of the switch 11 may be related for optimal operation. For example, in one example of the invention, the switch 11 is a birefringent liquid crystal cell (or a pair of them operating in push-pull manner), and such liquid crystal cells have an axis which sometimes is referred to as the rub direction or alignment direction of the liquid crystal cell. Using such a liquid crystal cell in the systems 3 or 19, for optimal operation the polarization direction (transmission direction axis of the polarizer 12, for example) should be at 45 degrees relative to the axis of the switch 11. Additionally, preferably the projection of the axis of the calcite crystal 30 is oriented at 45 degrees to the axis of the switch 11. These relationships are depicted in FIGS. 4a, 4b and 4c.

Figure 4A:
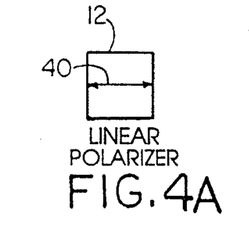
FIGS. 4a, 4b and 4c are, respectively, schematic illustrations indicating the axial alignment of the several components shown in FIG. 2.
Figure 4B:
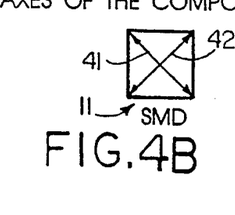
Figure 4C:
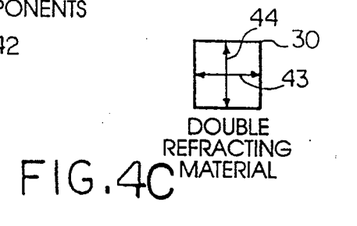

Briefly referring to FIGS. 4a, 4band 4c , the above-described relationships of axes is shown. In FIG. 4athe transmission axis of the polarizer 12 or the plane of polarization of light delivered by the liquid crystal display 20 is shown as horizontal at 40. However, such direction also may be vertical, because it is desired that the relationship between that axis and the axis of the liquid crystal cell(s) of the birefringent liquid crystal cell switch 11 be at a relative 45 degrees thereto. Such 45 degrees relationship is shown by the respective axes 41, 42 for the switch 11. In fact, such axes 41, 42 may represent the axis of one liquid crystal cell and the axis of a second liquid crystal cell, the two being arranged in optical series and being operated in push-pull fashion. The axes 43, 44 of the calcite crystal 30 are shown as horizontal and vertical. However, the vertical axis 44 actually is tipped in or out of the plane of the drawing and it actually is the projection of that axis which would appear as horizontal or vertical. In other words, the projection of the axes preferably is at 45 degrees to the axes 41, 42 of the switch 11. The described relative orientation of the axes of the various components used in connection with the invention is exemplary, and it will be appreciated that other arrangements may be used to obtain a particular type of operation. However, in the ideal simplified case described herein, the relationship described may be employed. Also, it will be appreciated that compensation may be provided to adjust the effective orientation of a particular axis. Such compensation can be provided using a birefringent material, a waveplate, such as a quarter waveplate or another one, etc., as was mentioned above.

Quarter waveplates, other waveplates, etc. may be used in conjunction with coupling of light along optical paths used in the electronic dithering system 1 and/or the optical display systems 3 or 19, etc. Also, such waveplates may be used to convert plane polarized light to circularly polarize light or vice versa, depending on the nature of the optical coupling occurring in the various components and optical paths and/or the switch 11 used in the invention.

Figure 5A:
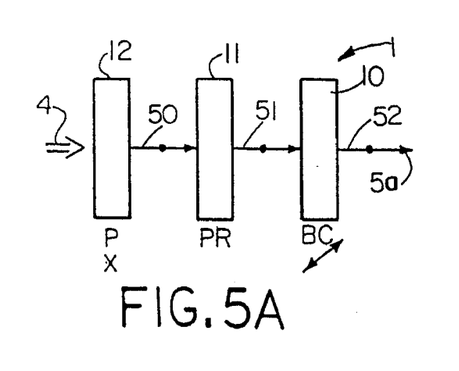
FIGS. 5a, 5b and 5c, are respectively, schematic illustrations similar to FIG. 2 showing the operation of the electronic dithering system on light in different operational modes.
Figure 5B:
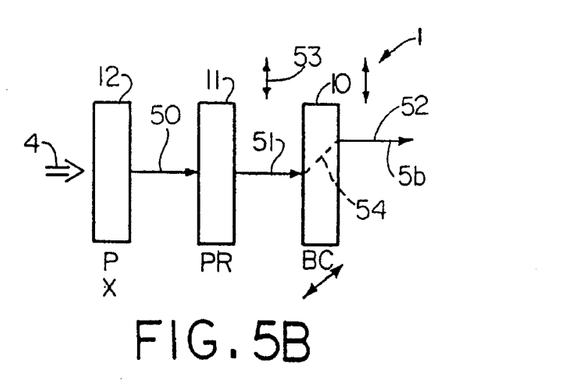
Figure 5C:
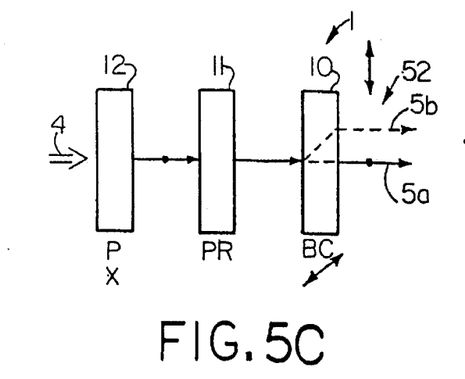

Referring to FIGS. 5a, 5b and 5c, operation of the EDS 1 according to the invention is depicted. Light 4, for example, from a CRT, is horizontally polarized by the polarizer 12. Arrow 50 represents such horizonal polarization, as does the dot in that arrow 50. The switch 11 is a birefringent liquid crystal cell of the type disclosed in the above-mentioned patents (such types sometimes being referred to as "surface mode" or "pi-cell" liquid crystal device). When the switch 11 is in the high voltage state it does not affect the state of polarization of the light 50. Therefore, light 51 exiting the switch 11 also has horizontal polarization, e.g., into and out of the plane of the paper of the drawing. The light 51 enters the double refracting material (birefringent material) 10 and is transmitted without any deflection and is provided as output light 52 at the location and in the direction of arrow 5a.

Referring to FIG. 5b, when the switch 11 is in the low voltage state, it rotates the plane of polarization of the light 50 preferably 90 degrees, i.e., into the vertical plane, as is shown by the vertical arrow 53 associated with the light 51. The vertically polarized light enters the double refracting material 10 and its path is physically displaced, as is represented by dashed line 54 resulting in output light 52 at the location and in the direction of the arrow 5b.

Briefly referring to FIG. 5c, the electronic dithering system 1 is shown having the light output 52 selectively switched between the location of the arrows 5a when the switch 11 is in the high voltage (no rotation of plane of polarization) state and the location of the arrow 5b, which occurs when the switch 11 is in the low voltage (polarization rotating) state. The light represented by arrow 5a is horizontally polarized, and the light represented by the arrow 5b is vertically polarized, as is represented in the drawing of FIG. 5c. By selectively energizing and de-energizing or, in any event, operating the switch 11 between two mentioned voltage states, which switch the polarization characteristic of the light, the location of the output optical signal 52 can be switched between the locations represented by arrows 5a and 5b.

Figure 6:
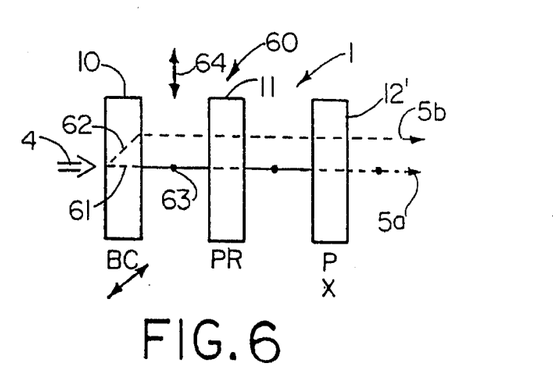
FIG. 6 is a schematic illustration of an alternate embodiment of electronic dithering system.

A modified optical display system 60 is shown in FIG. 6 using an electronic dithering system 1, as was described above, in combination with an output polarizer (analyzer) 12'. The analyzer 12' may be a linear (plane) polarizer or some other device which can discriminate between the characteristics of light incident therein, such as the direction of plane of polarization, circular polarization, etc. The parts of the electronic dithering system 1 include a birefringent material 10, such as a calcite material described above, and a switch 11, such as one of the liquid crystal cell devices described above, or some other device, as will be appreciated.

The incident light 4 is received from a light source or image source, such as a CRT 2 or some other device that delivers unpoladzed light output. Such unpolarized light 4 incident on the birefringent material 10 is divided into two components 61, 62. The light component 61 is horizontally polarized and it is transmitted directly through the birefringent material 10 without deflection or refraction. The light component 62 is polarized in the vertical direction, and it is refracted so that its path is deflected in the manner shown representatively in FIG. 6.

It will be appreciated that here and elsewhere in this description reference to directions is meant to be relative; for example, horizontal and vertical are meant to indicate orthogonal relationship. Directions are used to facilitate description and understanding of the invention.

The horizontally polarized light component 61 and the vertically polarized light component 62, the directions of polarization being represented by the dots 63 and the arrow 64, respectively, are incident on the switch 11. From the switch 11 the light components 61, 62 are incident on the analyzer 12'. That light component which has a polarization direction that is parallel to the transmission axis of the analyzer 12' will be transmitted through the analyzer, and the other light component will be blocked. Depending on whether the switch 11 is in the operative state to transmit light without rotation of the plane of polarization or is in the operative mode to rotate the plane of polarization of the light transmitted therethrough, one or the other of the light components 61, 62 will be transmitted through the analyzer 12' at a respective location represented by one of the arrows 5a, 5b.

Figure 7:
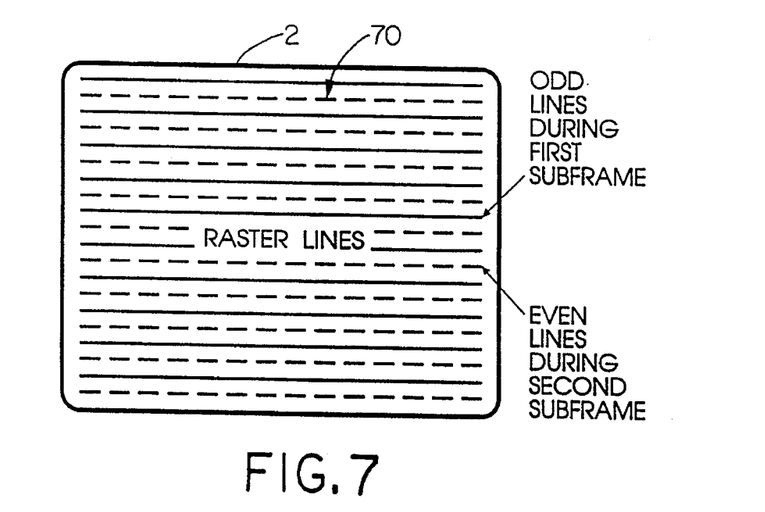
FIG. 7 is a schematic front view of the face or display output of a CRT showing exemplary raster lines.

An exemplary use of the invention is illustrated in FIG. 7 for the CRT display 2 or for a liquid crystal display 20, for example. The display 2, 20 has a resolution of some fixed number of raster lines or rows of pixels that are updated periodically, for example, 60 times per second.

Assume that the speed of the display is increased, for example, is doubled to 120 times per second to re-scan the raster lines and/or the rows of pixels. The switch 11 can be synchronized with the switching of the display (CRT 2) or liquid crystal display 20) such that the raster images, for example, are alternately displaced and not displaced, e.g., to locations 5a and 5b, respectively.

The amount of such shifting or displacement can be adjusted as aforesaid so that the displaced raster lines (or pixel rows) interdigitate the non-displaced raster lines (pixel rows). The information on the displaced and non-displaced rasters (pixel rows) are selected to carry complementary information; and, therefore, the resolution of the entire image displayed by the optical display system 3 or 19 is increased by a factor of 2. Without using more, the same technique can be used to provide image coverage over the dead space between adjacent pixels in a liquid crystal display (or in a CRT) or to cover areas where conductors or other electrical connections or components of a liquid crystal display, such as parts of an active matrix array are located, usually between adjacent pixels.

The display ordinarily would be refreshed or updated 60 times per second to cover both the odd and even raster lines. However, by increasing the refresh or update rate to 120 times per second and using the electronic dithering system to shift the location of the output image or optical signal for part of the time, essentially the odd and even raster lines, while unshifted, can be refreshed or updated 60 times per second and the odd and even raster lines, while shifted, can be refreshed or updated 60 times per second.

In FIG. 7 is shown an example of the front face 70 of the CRT display 2. The front face has a plurality of odd raster lines and a plurality of even raster lines. During operation of the CRT display 2, initially the odd raster lines are scanned to produce a first subframe. Subsequently, the even raster lines are scanned, and a second subframe is produced. The information produced during the respective first and second subframes is referred to as complementary and together completes an image that is viewed. The time between producing one subframe and the next is sufficiently fast that the eye of an observer (viewer) integrates the respective first and second subframe images to see one complete (composite) image. Similarly, using the principles of the present invention, the space between adjacent raster lines can in effect be scanned to produce additional complementary image information. Thus, for example, the odd lines can be scanned during the first subframe; the even fines can be scanned during the second subframe; the odd lines can be scanned during a third subframe but during which the switch 11 of the electronic dithering system 1 is operative to cause shifting of the image to the space between respective adjacent pairs of odd and even raster lines; and finally during a fourth subframe analogous to the third, the even raster lines can be scanned while the electronic dithering system provides a shift of optical output, to produce the shifted image between respective pairs of odd and even raster lines. In this way resolution of the output image produced by the optical display system 3 is increased without having to increase the resolution or space between relatively adjacent raster lines (scan lines) of the CRT display 2 or the pixels, pixel rows, etc. of the liquid crystal display 20.

Figure 8:
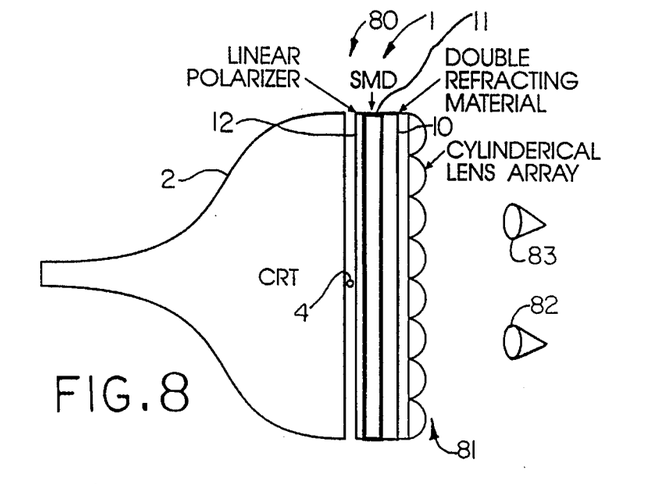
FIG. 8 is a schematic side elevation view of the electronic dithering system of the invention used in an auto-stereoscopic display.
Figures 9, 10, 11:
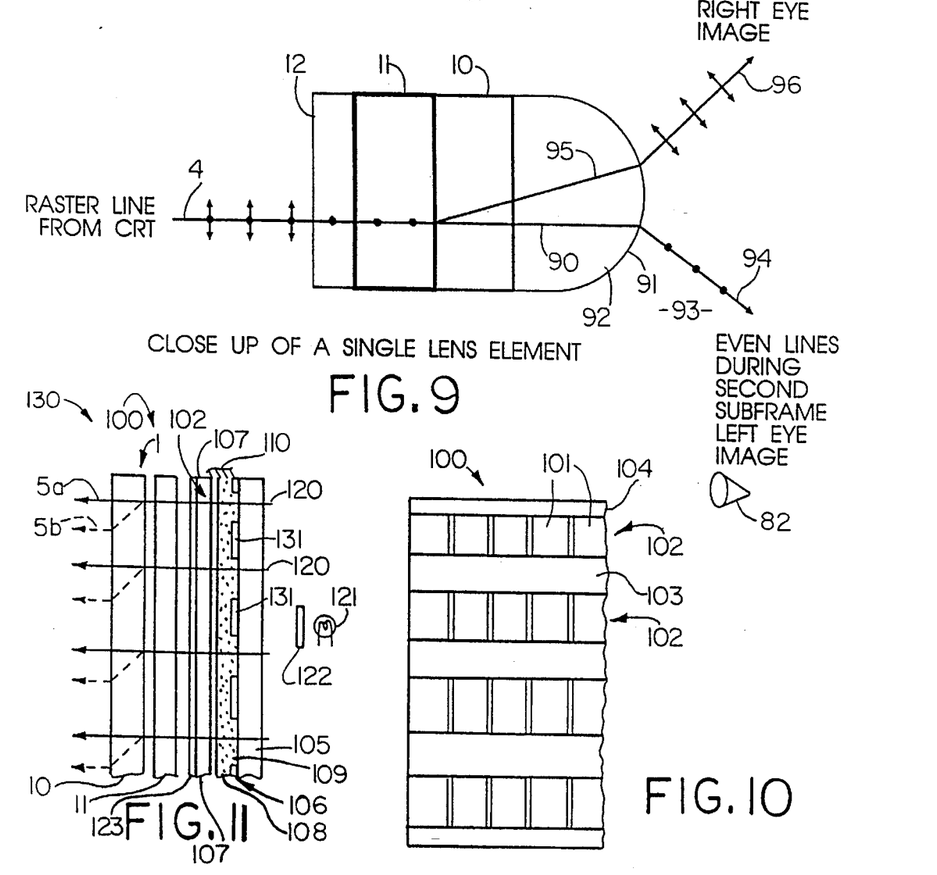
FIG. 9 is an enlarged view of a single lens element of the auto-stereoscopic display of FIG. 8.
FIG. 10 is a schematic plan view of part of a liquid crystal display showing areas where pixels are located and areas where there is circuity or dead space located between adjacent pixels.
FIG. 11 is a schematic top view of the display of FIG. 10 showing the paths of optical signals that are shifted in location according to the on or off state of the electronic dithering system of the display.

Turning to FIGS. 8 and 9, an auto-stereoscopic display system 80 is shown using the electronic dithering system 1 of the invention. The principles of auto-stereoscopic display are well known and will not be described in detail here. However, the technique of obtaining the auto-stereoscopic display effect will be described.

In the auto-stereoscopic display 80, there is a CRT display 2, which provides a light output 4, which is delivered to a linear polarizer 12. The plane polarized light from the linear polarizer 12 is provided to the electronic dithering system 1, which includes a surface mode device (surface mode liquid crystal cell) switch 11 and double refracting material (birefringent material) 10. At the output of the electronic dithering system 11 is a cylindrical lens array 81. The cylindrical lens array includes a plurality of cylindrical lenses located in an appropriate arrangement or pattern, as is known, to direct light to or toward respective eyes 82, 83 of a person, or to some other device able to detect or "see" the light received thereby. By providing a left eye image to the left eye 82 and a fight eye image to the fight eye 83, an individual viewing the auto-stereoscopic display system 80 will discern a three dimensional or stereoscopic effect.

Using the electronic dithering system 1 of the invention in combination with a display source, such as a CRT display 2, a liquid crystal display 20, or some other display, light beam steering can be accomplished to obtain the left eye and right eye images. Therefore, auto-stereoscopic display systems can be provided easily and relatively inexpensively.

In FIG. 9 the technique for obtaining beam steering for auto-stereoscopic effect is illustrated. Incident light 4, which is unpolarized, as is represented by the arrows and dots on the light is incident on the plane polarizer 12. Alternatively, plane polarized light can be provided from an image source or light source, such as a liquid crystal display. In any event, the light which exits the polarizer 12 is plane polarized, for example, in a horizontal plane, as is illustrated in FIG. 9. Such light then enters the switch 11 and from there the light enters and transmits through the double refracting material 10. Depending on whether the switch 11 rotates the plane of polarization or it does not rotate the plane of polarization of the light transmitted therethrough, the double refracting material 10 will deflect or will not deflect the light transmitted therethrough. In the case that the switch 11 does not rotate the plane of polarization, and the above-described alignment of the double refracting material 10 is provided, the light will transmit directly through the material 10 without deflection as light ray 90. When light ray 90 is transmitted through the interface 91 between the cylindrical lens 92 of the cylindrical lens array 81 and the external environment, such as air, represented at 93, the light 90 will refract in the direction of the arrow 94 toward the left eye 82 of the observer (viewer). The light 90 traveling in the direction of the arrow 94 remains polarized in the so-called horizontal direction, i.e., into and out of the plane of the paper of the drawing.

However, when the switch 11 rotates the plane of polarization of light transmitted therethrough, the double refracting material 10 deflects the light, as was described above, resulting in the light 95, which travels to a different location of the interface 91 of the lens 92. The light 95 refracts at the interface 91 and is bent or deflected in the direction of the arrow 96 toward the fight eye 83 of the observer. The light 95 is vertically polarized, i.e., the plane of polarization is parallel with the plane of the paper of the drawing of FIG. 9.

An operation of the auto-stereoscopic display 80, left eye and fight eye images sequentially are produced by the display 2 (20) for example. When the left eye image is displayed, the switch 11 does not rotate the plane of polarization, and the light 90 follows the direction of the arrow 94 to the left eye 82 of the observer. When the fight eye image is produced by the display, the switch 11 does rotate the plane of polarization so that the material 10 deflects the light as light 95 which is refracted to the direction of the arrow 96 to the fight eye 83 of the observer. For convenience of this description, it is understood that the indices of refraction of the material 10 and the material of which the lens 92 is made would be the same or about the same to avoid further refraction at the interface therebetween; however, if there is refraction there, such refraction can be taken into account, as will be appreciated by those having ordinary skill in the art.

Referring to FIGS. 10 and 11, a liquid crystal display 100, which has a plurality of pixels 101 arranged in respective rows 102 with dead space 103 between respective rows and also at the edge 104 of the display 100. As is seen in FIG. 11, the liquid crystal display 100 includes a substrate 105 on which an active matrix array 106 is located. The liquid crystal display also includes a further substrate 107, a space 108 between substrates where liquid crystal material 109 is located, a seal 110 to close the space between the substrates, and (not shown) appropriate driving circuitry, as is well known. Light 120 represented by respective arrows illustrated in FIG. 11 is provided by a light source 121 and is selectively transmitted or not through the liquid crystal display. The light 120 is plane polarized by a plane polarizer 122 located between the light source 121 and the liquid crystal display 100, and the light 120 is transmitted or is not transmitted as a function of the plane of polarization thereof relative to an analyzer 123, as is well known. An electrode on the substrate 107 and respective transistors and electrodes of the active matrix array 106 on the substrate 105 apply or do not apply electric field to liquid crystal material 109 at respective pixels 101 to determine whether or not the plane of polarization of light 120 is rotated and, thus, whether such light will be transmitted or not through the analyzer 123.

The light 120 which is transmitted through the analyzer 123 is incident on the electronic dithering system 1. The electronic dithering system may be operated to shift or not to shift the location of the light 120 to locations 5a, 5b in the manner described above. If the optical signal at locations 5a, 5b is complementary, as was described above, the resolution of the optical display system 130 shown in FIG. 11 can be increased. Moreover, as part of such increased resolution, the dead space 103 where transistors 131 and/or other components that are not light transmissive in the active matrix array 106 effectively are covered over by the shifted light 5b, for example. Therefore, using the electronic dithering system 1 in a display system 130 as described, the light blocking portions of the active matrix array, of conductors, etc., can be in effect overcome or negated while the overall resolution of the display is improved.

The parts shown in FIGS. 10 and 11 are in a relatively horizontal relation showing dithering in a vertical direction. It will be appreciated that dithering can alternatively be in a horizontal direction or, if desired, multiple electronic dithering systems 1 can be used in optical series in order to obtain both vertical dithering and horizontal dithering.

The embodiments of the invention in which an exclusive property or privilege is claimed are set forth in the following claims:

1. A device for shifting the location of an optical signal, comprising birefringent means for selectively refracting light based on optical polarization characteristic of the light, and means for changing such optical polarization characteristic of light, said birefringent means and said means for changing being cooperative to shift the location of the optical signal, a display for supplying an image as such optical signal, said display including plural picture elements and means for producing such image by selective operation of a plurlity of picture elements at respective locations of the display, and said birefringent means and means for changing are cooperative periodically to displace at least part of such image to increase the resolution thereof, said means for changing and birefringent means are cooperative to change the location of the image produced by respective picture elements as a function of optical polarization thereby effectively to increase the number of picture elements and the resolution of the image produced thereby.

2. The device of claim 1 said means for changing and birefringent means being cooperative to change the location of the output information without physical realignment of a mechanical device thereby effectively to increase the number of picture elements.

3. The device of claim 1, wherein such optical polarization characteristic comprises the direction of plane of polarization of light, and said means for changing comprises means for selectively changing the direction of such plane of polarization.

4. The device of claim 1, wherein said birefringent means comprises means for altering the direction of light transmitted therein based on the direction of plane of polarization of light transmitted therethrough.

5. The device of claim 1, wherein said birefringent means comprises means for directing light transmitted therein in different respective light paths depending on the optical polarization characteristic of the transmitted light.

6. The device of claim 1, said birefringent means comprising means for resolving light into two components respectively having orthogonal planes of polarization.

7. The device of claim 6, said birefringent means comprising means for deflecting one of such components.

8. The device of claim 7, said birefringent means comprising means for transmitting one of such components substantially without deflection.

9. The device of claim 1, further comprising means for operating said means for changing periodically for cooperation with said birefringent means to effect interdigitation of portions of such image.

10. The device of claim 1, said birefringent means and said means for changing being in optical series.

11. The device of claim 10, said means for changing being optically upstream from said birefringent means.

12. The device of claim 10, said means for changing being optically downstream from said birefringent means.

13. The device of claim 12, wherein such optical polarization characteristic comprises the direction of plane of polarization of light, said means for changing comprises means for selectively changing the direction of such plane of polarization, and further comprising an analyzer optically downstream from said means for changing and said birefringent means for discriminating between light based on plane of polarization to transmit or to block transmission of light based on such discrimination.

14. The device of claim 13, said birefringent means comprising means for resolving incident unpolarized light into two components respectively having orthogonal planes of polarization.

15. The device of claim 1, said display comprising means for supplying plane polarized light as such optical signal.

16. The device of claim 1, said display comprising means for supplying unpolarized light as such optical signal.

17. The device of claim 1, said display comprising a light emissive display.

18. The device of claim 17, said display comprising a cathode ray tube.

19. The device of claim 18, further comprising means for operating said means for changing periodically for cooperation with said birefringent means to effect interdigitation of portions of such image.

20. The device of claim 1, said display comprising a display having optical dead space.

21. The device of claim 20, further comprising means for operating said means for changing periodically for cooperation with said birefringent means to effect shifting of portions of such image to cover dead space of such display.

22. The device of claim 1, said display comprising a liquid crystal display.

23. The device of claim 1, said birefringent means comprising means to effect double refraction.

24. The device of claim 1, said birefringent means comprising crystal material.

25. The device of claim 24, said birefringent means comprising calcite.

26. The device of claim 1, said birefringent means comprising crystal having axes such that plane polarized light transmitted in such crystal is deflected or is transmitted without deflection depending on the relationship of the direction of plane of polarization to the direction of such axes.

27. The device of claim 26, said means for changing comprising a birefringent liquid crystal cell having an axis, and wherein the axis of said liquid crystal cell and the projection of the axes of said birefringent means are effectively relatively positioned at 45 degrees to each other.

28. The device of claim 27, said display comprising means for supplying plane polarized light as such optical signal.

29. The device of claim 28, said display comprising a liquid crystal display.

30. The device of claim 28, said display comprising a plane polarizer having a plane of polarization oriented effectively relatively at 45 degrees, to the axis of said liquid crystal cell.

31. The device of claim 28, wherein said display comprises means for supplying light in the visible spectrum.

32. The device of claim 1, said means for changing comprising a liquid crystal cell.

33. The device of claim 32, said liquid crystal cell comprising a twisted nematic liquid crystal device.

34. The device of claim 32, said liquid crystal cell comprising a birefringent liquid crystal device.

35. The device of claim 1, wherein said means for changing and birefringent means comprising means for electro-optically changing the location of the output information thereby effectively to increase the number of picture elements.

36. A system for increasing the resolution of an optical display having a plurality of picture elements, comprising birefringent means for selectively refracting light based on polarization characteristics of the light, changing means for selectively changing the polarization characteristics of light, and said birefringent means and said changing means being in optical series and cooperative in response to selective operation of said changing means to change the location of output optical signals therefrom, wherein the display is operative to produce an image and the display has dead space in respective picture elements, and further comprising means for operating said changing means periodically for cooperation with said birefringent means to effect shifting of portions of such image to cover dead space of such display.

37. The system of claim 36, further comprising means for operating said changing means periodically for cooperation with said birefringent means to effect interdigitation of portions of such image.

38. The device of claim 36, Wherein the display comprises a liquid crystal display.

39. An electro-optical dithering system for shifting polarized light, comprising birefringent means for selectively refracting light as a function of a polarization characteristic of the light, and changing means for changing the polarization characteristic of polarized light to provide output light that is shifted or not as a function of optical polarization, said birefringent means comprising crystal having axes such that plane polarized light transmitted in such crystal is deflected or is transmitted without deflection depending on the relationship of the direction of plane of polarization to the direction of such axes, said birefringent means having a pair of generally parallel faces, respectively for receiving an input optical signal and for transmitting at least one output optical signal at a location depending on the plane of polarization of light of such output optical signal, and wherein the directions of such axes are non-parallel with the planes of said parallel faces, said means for changing comprising a birefringent liquid crystal cell having an axis, and wherein the axis of said liquid crystal cell and the projection of the axes of said birefringent means are effectively relatively positioned at 45 degrees to each other, and further comprising means for supplying plane polarized light as such optical signal, said means for supplying comprising a liquid crystal display.

40. The system of claim 39, wherein said means for supplying comprises means for supplying light in the visible spectrum.

41. A method of making a display, comprising positioning in optical series an image source for producing an optical image for viewing, a birefringent means for selectively refracting light based on optical polarization characteristic of the light, and a changing means for changing such optical polarization characteristic, further comprising positioning such changing means optically downstream of such birefringent means, and positioning an optical polarization analyzer optically downstream of such changing means.

42. A method of using a display, made by positioning in optical series an image source for producing an optical image for viewing, a birefringent means for selectively refracting light based on optical polarization characteristic of the light, and a changing means for changing such optical polarization characteristic, for displaying visual information comprising presenting a first optical output from a source by providing plural optical signals arranged in a pattern, presenting a second optical output from the source by providing plural optical signals arranged in a pattern, and selectively shifting the location of the pattern of the second optical output relative to the location of the pattern of the first optical output based on optical polarization to increase resolution of the display.

43. The method of claim 42, wherein said selectively shifting the location of the pattern of the second optical output relative to the location of the pattern of the first optical output based on optical polarization covers optical dead space of the display.

44. A device for shifting the location of an optical signal forming an image of a display, comprising calcite birefringent material for refracting light based on optical polarization characteristic of the light, and a fast optical switch for changing such optical polarization characteristic of light, said calcite birefringent material and said fast optical switch being cooperative to shift the location of the optical signal, a display for presenting dynamic images as such optical signal, said display including plural picture elements and being operable to produce such dynamic images by selective operation of a plurality of picture elements at respective locations of the display, and said calcite birefringent material and fast optical switch are cooperative periodically to displace at least part of such image to increase the resolution thereof and said fast optical switch being operable at a speed sufficiently fast that the eye of an observer integrates at least two images to see a complete image, said fast optical switch and calcite birefringent material are cooperative to change the location of the image produced by respective picture elements as a function of optical polarization thereby effectively to increase the number of picture elements and the resolution of the image produced thereby.

45. The device of claim 44, said fast optical switch comprising a surface mode liquid crystal cell or pi-cell.

46. The device of claim 44, said fast optical switch comprising a birefringent liquid crystal cell.

47. The device of claim 44, wherein said calcite birefringent material is a calcite birefringent material crystal having axes such that plane polarized light transmitted in such calcite birefringent material crystal is deflected or is transmitted without deflection depending on the relationship of the direction of plane of polarization to the direction of such axes, said calcite birefringent material crystal having a pair of generally parallel faces, respectively for receiving an input optical signal and for transmitting at least one output optical signal at a location depending on the plane of polarization of light of such output optical signal, and wherein the directions of such axes are non-parallel with the planes of said parallel faces, and said fast optical switch comprising a birefringent liquid crystal cell having an axis, and wherein the axis of said liquid crystal cell and the projection of the axes of said calcite birefringent material crystal are effectively relatively positioned at 45 degrees to each other.

48. An electro-optical dithering system for shifting polarized light, comprising birefringent crystal for selectively refracting light, which is received from an optical display that produces sequential images to provide a dynamic video display output, as a function of a polarization characteristic of the light, and a fast acting optical switch for changing the polarization characteristic of polarized light to provide output light that is shifted or not as a function of optical polarization, said birefringent crystal having axes such that plane polarized light transmitted in such crystal is deflected or is transmitted without deflection depending on the relationship of the direction of plane of polarization to the direction of such axes, said birefringent crystal having a pair of generally parallel faces, respectively for receiving an input optical signal and for transmitting at least one output optical signal at a location depending on the plane of polarization of light of such output optical signal, and wherein the directions of such axes are non-parallel with the planes of said parallel faces, and said fast acting optical switch comprising a birefringent liquid crystal cell operable at a speed sufficiently fast that the eye of an observer integrates at least two images to see a complete image.

49. The system of claim 48, said fast acting optical switch comprising a surface mode liquid crystal cell or pi-cell liquid crystal cell.

50. The system of claim 48, further comprising a display for presenting dynamic images as such optical signal, said display including plural picture elements and being operable to produce such dynamic images by selective operation of a plurality of picture elements at respective locations of the display, and said birefringent crystal comprising calcite, said calcite and said fast acting optical switch are cooperative periodically to displace at least part of such image to increase the resolution thereof, said fast optical switch and calcite birefringent material are cooperative to change the location of the image produced by respective picture elements as a function of optical polarization thereby effectively to increase the number of picture elements and the resolution of the image produced thereby.

51. A method of using a display, made by positioning in optical series an image source for producing an optical image for viewing, a birefringent means for selectively refracting light based on optical polarization characteristic of the light, and a changing means for changing such optical polarization characteristic, for displaying visual information, comprising presenting a first optical output from a source by providing plural optical signals arranged in a pattern, presenting a second optical output from the source by providing plural optical signals arranged in a pattern, and selectively shifting the location of the pattern of the second optical output relative to the location of the patten of the first optical output based on optical polarization to cover optical dead space of the display.

\* \* \* \* \*